United States Patent [19]

Rooney

[11] Patent Number: 5,166,310
[45] Date of Patent: Nov. 24, 1992

[54] PREPARATION OF POLYESTERS WITH TIN CATALYST

[75] Inventor: Peter C. Rooney, Lake Jackson, Tex.

[73] Assignee: The Dow Chemical Company, Midland, Mich.

[21] Appl. No.: 750,672

[22] Filed: Aug. 27, 1991

[51] Int. Cl.$^5$ .................. C08G 63/78; C08G 63/82; C08G 63/00

[52] U.S. Cl. .................. 528/283; 528/176; 528/193; 528/194; 528/279

[58] Field of Search .............. 528/176, 193, 194, 279, 528/283

[56] References Cited

U.S. PATENT DOCUMENTS

| | | | |
|---|---|---|---|
| 2,720,507 | 10/1955 | Caldwell | 528/283 |
| 3,162,616 | 12/1964 | Dombrow | 528/283 |
| 3,345,339 | 10/1967 | Parket et al. | 528/283 |
| 3,716,523 | 2/1973 | Cook | 528/283 |
| 4,018,708 | 4/1977 | Vogt et al. | 252/431 |
| 4,020,010 | 4/1977 | Vogt et al. | 252/431 |
| 4,072,631 | 2/1978 | Vogt et al. | 252/431 |
| 4,554,344 | 11/1985 | Jackson, Jr. et al. | 528/283 |
| 4,970,288 | 11/1990 | Larkin et al. | 528/272 |

*Primary Examiner*—John Kight, III
*Assistant Examiner*—T. Mosley

[57] ABSTRACT

Polyesters are prepared from dihydroxyl-containing compounds and di-carboxylic acids or anhydrides or lower alkyl esters thereof in the presence of a combination of tin catalysts comprising (1) at least one organotin salt of a carboxylic acid, and (2) either (a) at least one organotin oxide, or (b) at least one organostannoic acid, or (c) a combination of (a) and (b). The polyesters prepared by this process are useful in coating, adhesive, fiber and molding applications.

3 Claims, No Drawings

PREPARATION OF POLYESTERS WITH TIN CATALYST

FIELD OF THE INVENTION

The present invention pertains to a process for the preparation of polyesters in the presence of a combination of tin catalysts.

BACKGROUND OF THE INVENTION

It is well known that organotin compositions, including organotin oxides, hydroxides, alkoxides and carboxylates are effective as catalysts in the manufacture of polyester resins and polyester-containing compositions. The use of tin catalysts in the esterification of polyesters is disclosed by Caldwell in U.S. Pat. No. 2,720,507, by Dombrow et al. in U.S. Pat. No. 3,162,616, by Allison et al. in U.S. Pat. No. 3,345,339, by Cook in U.S. Pat. No. 3,716,523 and by Jackson, Jr. et al. in U.S. Pat. No. 4,554,334. The organotin catalysts decrease the time required to complete the reaction. The use of non-toxic organotin esterification catalysts in the production of polyesters to produce non-toxic compositions is discussed by Larkin et al. in U.S. Pat. No. 4,970,288.

Polyesters are formed by the condensation of a dibasic or polybasic acid and a dihydric or polyhydric alcohol to form a series of ester linkages. Optionally, a tri-functional or polyfunctional alcohol or acid functional branching agent may be used to enhance the properties of the polyester or polyester-containing material formed from the polyester. Also, optionally, monofunctional monomers such as benzoic acid or stearic acid can be used to control molecular weight.

Theoretically, one equivalent of polyol is utilized for each equivalent of acid. However, a hydroxyl-terminated polyester is prepared using an excess of polyol and a carboxyl-terminated polyester is prepared using an excess of acid. When a carboxyl-terminated polyester is prepared in a two-stage or multi-stage reaction, it is common to use excess polyol in the first stage and react this hydroxyl-terminated polyester with an excess amount of acid or anhydride in the second stage. The advantage of a two-stage synthesis, as disclosed in the above patents, is that the polyester can be prepared having excellent color and/or can be produced in less time than by using a one-stage reaction.

Esters can also be prepared by transesterification reactions. When using the ester-interchange method the long chain in the polyester is built up by a series of ester interchange reactions wherein the glycol displaces an ester to form the glycolester. Included are the reactions between two esters to yield two new esters and also include the transesterification reactions where the components of the esters involved are polyhydroxy alcohols and polybasic acids.

As discussed in the above patents, the polyester is prepared by heating the condensing mixture at temperatures of at least about 170° C. up to about 275° C. or higher in order to maintain the fluid state. The reaction can be performed above atmospheric pressure, up to about 20 psig (14062 kg/m$^2$) or higher, at atmospheric pressure or under vacuum to about 15 mm Hg or lower. The esterification reaction can be conducted in the presence of a suitable solvent such as toluene or xylene and the like. Nitrogen, argon, helium or any other suitable gas may be introduced into the reactor to keep air out of the reactor or to facilitate the removal of water, low-boiling alcohol, mixtures thereof or the like. The polyesters can also be thinned in a suitable reactive monomer such as styrene or divinyl benzene as disclosed in the above references, or mixtures thereof and the like.

It would be desirable to have available a process for the preparation of polyesters which would result in less reaction time and which would result in a polyester with improved properties such as, lower color values, reduced by-products and the like.

SUMMARY OF THE INVENTION

The present invention pertains to an improved process for the preparation of hydroxyl or acid terminated polyesters by reacting a dihydroxyl-containing compound with a dicarboxyl-containing compound or anhydride or lower alkyl ester thereof and optionally a tri- or poly-functional hydroxyl or carboxyl containing compound or anhydride or lower alkyl ester thereof in the presence of a tin catalyst; wherein the improvement resides in conducting the reaction in the presence of a combination of catalysts comprising (1) at least one organotin salt of a carboxylic acid, and (2) either (a) at least one organotin oxide, or (b) at least one organostannoic acid, or (c) a combination of (a) and (b).

The process of the present invention provides a faster reaction than does either of the catalyst components employed alone and/or it provides a polyester product which has an improvement in one or more of the properties selected from color, by-product formation or the like.

DETAILED DESCRIPTION OF THE INVENTION

The process of the present invention can be conducted at temperatures usually employed in the preparation of polyester resins, of from about 150° C. to about 270° C., preferably from about 170° C. to about 270° C., more preferably from about 180° C. to about 250° C. The reaction is conducted for a time sufficient to bring the reaction to the desired degree of completion. For hydroxyl terminated polyesters, the reaction is usually considered complete when the hydroxyl value of the reaction mixture is below about 150, preferably below about 100, more preferably below about 80. For acid or carboxyl terminated polyesters, the reaction is usually considered complete when the acid number of the reaction mixture is below about 100, preferably below about 90, more preferably below about 70.

At temperatures below about 150° C. the reaction generally proceeds too slow to suit industrial needs.

At temperatures above about 270° C. the polyester may become colored and/or by-product formation such as ethers may result.

The reaction is conveniently conducted at pressures from about 700 mm Hg to about 1,500 mm Hg. The reaction temperature and pressure are balanced such that the water or low-boiling alcohol of reaction is removed as quickly as possible while not distilling the low-boiling reactants, generally glycols, from the reaction. It is generally advantageous to finish the reaction at reduced pressure, generally below about 100 mm Hg, preferably below about 50 mm Hg, more preferably below about 10 mm Hg.

Pressures below about 10 mm Hg are generally difficult to achieve on an industrial scale.

At pressures above about 1500 mm Hg, the rate of removal of water or low-boiling alcohol from the reaction is greatly reduced.

The reaction temperature and pressure are balanced such that the water or low-boiling alcohol produced in the reaction, depending upon whether the starting material is an acid or a lower alkyl ester thereof, is removed as quickly as possible while not distilling off any low-boiling reactants.

The time required to achieve the desired degree of reaction depends upon many factors, such as heating and cooling capacity, reaction vessel size, particular reactants and catalyst, and the like. Generally, for lab scale reactions up to about 2 liters, the reaction is usually complete in less than about 12 hours, preferably in less than about 10 hours, more preferably in less than about 8 hours.

It is anticipated that in most commercial production reactors used on an industrial scale, the time to essentially complete the reaction is less than about 36 hours, preferably less than about 30 hours, more preferably less than about 24 hours.

ORGANOTIN SALTS

Suitable organotin salts of a carboxylic acid which can be employed herein include, for example, those represented by the following formulas $R-Sn(O_2CR')$, $R_2Sn(O_2R')_2$, $R_2Sn(O_2CR')(OCR')$, $R-Sn(O_2CR')_3$ or $R-Sn(O_2CR')_2Y$; wherein each R is the same or different and is an alkyl group having from 1 to about 20, preferably from 1 to about 12, more preferably from 1 to about 8, carbon atoms, or an aryl, alkaryl or cycloalkyl group having from about 6 to about 14 carbon atoms; each R' can be the same or different and is an alkyl group having from 1 to about 20, preferably from 1 to about 12, more preferably from 1 to about 8, carbon atoms, or an aryl, alkaryl or cycloalkyl group having from about 6 to about 14 carbon atoms. The R groups can be saturated or unsaturated and can be substituted or unsubstituted with such substituent groups as alkyl, aryl or cycloalkyl groups having from 1 to about 20 carbon atoms, halogen, preferably chlorine or bromine, $-NO_2$, and the like; and Y is a halogen, preferably chlorine or bromine. Such organotin salts of a carboxylic acid include, but are not limited to stannous acetate, stannous laurate, stannous octoate, stannous oleate, stannous oxalate, dibenzyltin diacetate, dibenzyltin distearate, dibutylmethoxytin acetate, dibutyltin diacetate, dibutyltin dilaurate, dibutyltin maleate, dilauryltin diacetate, dioctyltin diacetate, dioctyltin dilaurate, diphenyltin diacetate, methyltin trilaurate, methyltin tris(2-ethylhexoate), butyltin triacetate, butyltin trilaurate, butyltin tris(2-ethylhexoate), or any combination thereof and the like. Particularly suitable such organotin salts of carboxylic acids include, for example, dibutyltin diacetate, dibutyltin dilaurate, stannous octoate, dioctyltin dilaurate or any combination thereof and the like.

ORGANOTIN OXIDES

Suitable organotin oxides which can be employed herein include, for example, those represented by the formula $R_2SnO$ wherein R is as defined above. Such organotin oxides include, but are not limited to bis(carbomethoxyethyl) tin oxide, diallyltin oxide, dibenzyltin oxide, dibutyltin oxide, dicyclohexyltin oxide, dilauryltin oxide, dimethyltin oxide, di-1-naphthyltin oxide, dioctyltin oxide, diphenyltin oxide, divinyltin oxide, or any combination thereof and the like. Particularly suitable organotin oxides include, for example, dibutyltin oxide, dimethyltin oxide or any combination thereof and the like.

ORGANOSTANNOIC ACIDS

Suitable organostannoic acids which can be employed herein include, for example, those represented by the formula R-SnOOH or their corresponding anhydrides represented by the formula $(R-SnO)_2O$ wherein R is as defined above. Such organostannoic acids or anhydrides thereof include, but are not limited to phenylstannoic acid, chlorobenzylstannoic acid, 1-dodecylstannoic acid, methylstannoic acid, 1-naphthylstannoic acid, butylstannoic acid, octylstannoic acid, their anhydrides, or any combination thereof and the like. Particularly suitable organostannoic acids or anhydrides include, for example, butylstannoic acid, methylstannoic acid or any combination thereof and the like.

CATALYST CONCENTRATION

The tin catalysts of the present invention are employed in an amount which provides a total amount of catalyst of from about 0.001 to about 3, preferably from about 0.01 to about 1.0, more preferably from about 0.05 to about 0.2 weight percent based upon the weight of the reactants.

The organotin salt of a carboxylic acid catalyst (component 1) is employed in an amount of from about 0.01 to about 99.99, preferably from about 0.01 to about 60, more preferably from about 0.01 to about 30 mole percent based upon the total amount of catalyst; and the organotin oxide and/or organostannoic acid catalyst (component 2) is employed in an amount of from about 0.01 to about 99.99, preferably from about 50 to about 99.99, more preferably from about 70 to about 99.99 mole percent based upon the total amount of catalyst.

DIOL COMPOUNDS

Suitable diols (compounds containing two hydroxyl groups per molecule) which can be employed herein, include, for example, aliphatic, cycloaliphatic or aromatic diols which can be either saturated or unsaturated. These diols can have from 2 to about 20, preferably from about 2 to about 12, more preferably from 2 to about 8, carbon atoms per molecule. Such diols include, but are not limited to, ethylene glycol, propylene glycol, 1,4-butanediol, 1,3-butanediol, 1,2-butanediol, pentanediol, hexanediol, heptanediol, neopentyl glycol, nonanediol, decanediol, 2,2,4-trimethyl-1,3-pentanediol, diethylene glycol, dipropylene glycol, cyclohexanedimethanol, 2-methyl-1,3-propanediol or any combination thereof and the like. Particularly suitable such diols include, for example, neopentyl glycol, ethylene glycol, cyclohexanedimethanol or any combination thereof and the like.

ORGANIC DICARBOXYLIC ACIDS and ANHYDRIDES and ESTERS

Suitable organic dicarboxylic acids which can be employed herein include, for example, aliphatic, cycloaliphatic or aromatic diacids having from about 2 to about 20 carbon atoms. These diacids can be either saturated or unsaturated. Also suitable are the anhydrides thereof. Such diacids or anhydrides include, but are not limited to, adipic acid, terephthalic acid, oxalic acid, succinic acid, sebacic acid, fumaric acid, azelaic acid, suberic acid, phthalic acid, isophthalic acid, hexahydrophthalic acid, succinic anhydride, phthalic anhydride or any combination thereof and the like. Particularly suitable such acids or anhydrides include, for example, terephthalic acid, isophthalic acid, adipic acid or any combination thereof and the like.

Also suitable are the lower alkyl, $C_1$ to $C_4$ esters of any of the aforementioned dicarboxylic acids. Particularly suitable such esters include, for example, the methyl, ethyl or propyl mono and diesters of adipic acid, terephthalic acid, oxalic acid, succinic acid, sebacic acid, fumaric acid, azelaic acid, suberic acid, phthalic acid, isophthalic acid, hexahydrophthalic acid, or any combination thereof and the like.

MONOFUNCTIONAL REACTANTS

In some instances, it is desirable to incorporate monofunctional compounds into the reaction to control molecular weight. Suitable such monofunctional reactants include, for example, benzoic acid, tert-butylbenzoic acid, phenylbenzoic acid, stearic acid, tert-butylphenol, benzyl alcohol, or any combination thereof and the like.

These monofunctional compounds, when employed, are employed in amounts of from about 0.01 to about 10, preferably from about 1 to about 8, more preferably from about 2 to about 5 weight percent based upon the total weight of reactants.

POLYFUNCTIONAL REACTANTS

In some instances it is desirable to introduce chain branching into the polyester being prepared. In order to do this a tri- or poly-functional reactant is introduced into the reaction mixture. This tri- or poly-functional reactant can be either hydroxyl or acid or anhydride functional. Particularly suitable tri- or poly-functional reactants which can be employed herein include, for example, trimellitic anhydride, trimethylolpropane, glycerine, triethylolpropane and pentaerythritol or any combination thereof and the like.

These polyfunctional compounds are employed in amounts of from about 0.01 to about 10, preferably from about 0.1 to about 7, more preferably from about 0.1 to about 5 weight percent based upon the total weight of reactants.

REACTION SOLVENTS

If desired, the process of the present invention for preparing polyesters can be conducted in the presence of a suitable solvent such as, for example, aromatic hydrocarbons, ethers, sulfones, chlorinated aromatic hydrocarbons, sulfolanes, sulfoxides or any combination thereof and the like. Particularly suitable such solvents include, for example, toluene, xylene, diphenyl ether, dimethyl sulfolane or any combination thereof and the like.

The solvent can be employed in amounts of from about 40 to about 95, preferably from about 45 to about 90, more preferably from about 50 to about 90, percent by weight based upon the weight of the reactants.

The polyesters prepared by the process of the present invention are useful in coating, adhesive, fiber and molding applications.

The following examples are illustrative of the invention.

EXAMPLES 1-17

Apparatus

These examples are conducted in a 2-L flask equipped with a heating mantle, stirrer, thermometer, nitrogen inlet (initially set at 5 ml/min) and connected to an oil heated column (maintained at 100° C.) packed with stainless steel wire. This oil heated column is connected to a Dean-Stark trap equipped with a condenser for the collection of water.

The polyesters are prepared in two steps or stages as follows:

Stage 1—Preparation of a Hydroxyl-terminated Polyester

The flask is charged with the following:

| | | |
|---|---|---|
| Terephthalic acid | 867.3 g | (5.1 moles) |
| Neopentyl glycol | 570.0 g | (5.5 moles) |
| Trimethylolpropane | 10.7 g | (0.1 mole) |
| Tin catalyst | | 4.76 mmoles total |

This mixture is heated to 180° C. and held at that temperature for 30 min. The temperature is then increased to 200° C. for a total of 30 min., then to 220° C. for a total of 2 hrs, then to 230° C. for a total of 1 hr and finally to 250° C. The reaction is monitored by periodically measuring the acid number and the viscosity using an I.C.I. cone and plate viscometer. When a viscosity of about 50 Poise at 175° C. and an acid number of about 14 is obtained the resin is clear and the first stage is completed. The hydroxyl number of this polyester is calculated to be about 58 at this stage.

Stage 2—Preparation of a Carboxyl-Terminated Polyester

To the reactor containing the reaction product from Stage 2 is added:

| | | |
|---|---|---|
| Isophthalic acid | 126.6 g | (0.8 mole) |

On hour after addition of the isophthalic acid the nitrogen flow rate is increased to 10 ml/min. Forty-five minutes later the nitrogen flow rate is increased to 20 ml/min until a final acid number of about 38 and a final viscosity of about 190 Poise at 175° C. is obtained whereupon the resin is poured onto a pan of aluminum foil. The APHA color of all the resins in this example, measured as a 10 wt % solution of resin in tetrahydrofuran, are less than or equal to about 20.

The results are given in Table I.

TABLE 1

| | Catalyst | Time to 1st Stage (min) | Time to Final Acid Number(min) |
|---|---|---|---|
| 1* | Butylstannoic acid | 415 | 635 |
| 2* | Dimethyltin oxide | 400 | 630 |
| 3* | Dibutyltin oxide | 475 | 655 |
| 4* | Dioctyltin oxide | 475 | 670 |
| 5* | Dibutyltin diacetate | 500 | >635 |
| 6* | Dibutyltin dilaurate | 470 | 695 |
| 7* | Stannous octoate | >690 | >690 |
| 8* | Butylchlorotin dihydroxide | 425 | 670 |
| 9* | Butylchlorotin dihydroxide/ Dibutyltin dilaurate$^c$ | 450 | 720 |
| 10 | Butylstannoic acid/dibutyltin diacetate$^c$ | 420$^a$ | 600 |
| 11 | Butylstannoic acid/dibutyltin dilaurate$^c$ | 360 | 495 |
| 12 | Butylstannoic acid/stannous octoate$^c$ | 455$^b$ | 590 |
| 13 | Dibutyltin oxide/dibutyltin diacetate$^c$ | 450 | 620 |
| 14 | Dibutyltin oxide/dibutyltin | 415 | 615 |

TABLE 1-continued

| | Catalyst | Time to 1st Stage (min) | Time to Final Acid Number(min) |
|---|---|---|---|
| | dilaurate[c] | | |
| 15 | Dibutyltin oxide/stannous octoate[c] | 410 | 575 |
| 16 | Dimethyltin oxide/dibutyltin dilaurate[c] | 420[b] | 600 |
| 17 | Dioctyltin oxide/dibutyltin dilaurate[c] | 420 | 550 |

*Not an example of the present invention.
[a]Is not faster than single catalyst, however, at a different catalyst mole ratio, the reaction is faster than single catalyst (see Example 18).
[b]Is not faster at the first stage than a single catalyst, but like above, a different catalyst ratio should be faster than a single catalyst.
[c]Mole ratio is 50/50.

EXAMPLE 18

The polyester prepared in Example 10 (above) is prepared here exactly as above using a different mole ratio of butylstannoic acid to dibutyltin diacetate. When an equimolar amount of these two catalysts is used as in Example 10 above, the time to complete the first stage (420 min) is not faster than butylstannoic acid alone (415 min). In this Example 18, 0.80 g butylstannoic acid (3.83 mmoles) and 0.32 g dibutyltin diacetate (0.91 mmoles) are used. The time to complete the first stage is 360 min and the time to reach the final acid number of about 38 is 525 min. The APHA color of the final resin is 10. This example demonstrates the synergy of the two catalysts versus the use of only one catalyst at a substantially equimolar concentration (4.76 mmoles for the single catalysts vs. 4.74 mmoles for the combination catalyst). Further, it demonstrates that an equimolar concentration of catalyst combination may not be the optimum for a particular polyesterification reaction.

EXAMPLES 19-24

A relatively high acid number polyester is prepared in a two-stage process using various mole ratios of dibutyltin oxide (DBTO) and/or dibutyltin diacetate (DBTDA) catalyst. A total of 4.76 mmoles of tin catalyst is used in all reactions.

Apparatus

These examples are conducted in a 2-L flask equipped with a heating mantle, stirrer, thermometer, nitrogen inlet (initially set at 5 ml/min) and connected to an oil heated column (maintained at 100° C.) packed with stainless steel wire. This oil heated column is connected to a Dean-Stark trap equipped with a condenser for the collection of water.

The polyesters are prepared in two steps or stages as follows:

Stage 1—Preparation of a Hydroxyl-terminated Polyester

The flask is charged with the following:

| Terephthalic acid | 441.6 g | (2.7 moles) |
|---|---|---|
| Neopentyl glycol | 454.1 g | (4.4 moles) |
| Adipic acid | 156.0 g | (1.1 moles) |
| Tin catalyst | | (4.76 mmoles total) |

This mixture is heated to 180° C. and held at that temperature for 30 min. The temperature is then increased to 200° C. for a total of 30 min., then to 220° C. for a total of 2 hrs, then to 230° C. for a total of 1 hr and finally to 240° C. The reaction is monitored by periodically measuring the acid number and the viscosity using an I.C.I. cone and plate viscometer. When a viscosity of about 10 Poise at 175° C. and an acid number of about 10 is obtained the resin is clear and the first stage is completed. The hydroxyl number of this polyester is calculated to be about 87 at this stage.

Stage 2—Preparation of a Carboxyl-Terminated Polyester

To the reactor is added:

| Isophthalic acid | 239.9 g | (1.4 moles) |
|---|---|---|

One hour after addition of the isophthalic acid the nitrogen flow rate is increased to 10 ml/min. The resin is poured onto a pan of aluminum foil after a total synthesis time of 490 minutes whereupon the final acid number and viscosity is recorded. The results show that the synthesis times to the end of the first stage are shorter for the combination tin catalyst and that the final acid number at 490 min total synthesis time is lower for the catalyst combination than for the individual catalyst DBTO or DBTDA. The results are given in Table II.

TABLE II

| | Catalyst | Catalyst Mole ratio | Time to 1st State(min) | Final Acid Number |
|---|---|---|---|---|
| 19* | DBTO[a] | — | 400 | 128 |
| 20* | DBTDA[b] | — | 390 | 98 |
| 21* | DBTO/DBTDA | 0.13 | 370 | 90 |
| 22* | DBTO/DBTDA | 0.25 | 355 | 88 |
| 23* | DBTO/DBTDA | 0.50 | 370 | 89 |
| 24* | DBTO/DBTDA | 0.94 | 340 | 87 |

*Not an example of the present invention.
[a]DBTO is dibutyltin oxide.
[b]DBTDA is dibutyltin diacetate.

EXAMPLES 25-27

Preparation of an Acid-Terminated Polyester in One Stage

Apparatus

The following examples are conducted in a 2-L flask equipped with a heating mantle, stirrer, thermometer, nitrogen inlet (initially set at 5 ml/min) and connected to an oil heated column (maintained at 100° C.) packed with stainless steel wire. This oil heated column is connected to a Dean-Stark trap equipped with a condenser for the collection of water.

A carboxyl-terminated polyester is prepared in one stage. A total of 8.03 mmoles of tin catalyst is used in all reactions. When two catalysts are used, equimolar amounts of each catalyst are used for a total of 8.03 mmoles.

The flask is charged with the following:

| Terephthalic acid | 762.6 g | (4.6 moles) |
|---|---|---|
| Neopentyl glycol | 607.0 g | (5.8 moles) |
| 1,4-cyclohexanedicarboxylic acid | 225.0 g | (1.3 moles) |
| Trimellitic anhydride | 16.1 g | (0.1 moles) |
| Tin catalyst | | 8.03 mmoles total |

This mixture is heated to 180° C. and held at that temperature for 30 min. The temperature is then increased to 200° C. for a total of 30 min., then to 220° C.

for a total of 1.5 hrs, then to 230° C. for a total of 1 hr, then to 240° C. for a total of 1.5 hrs and finally to 250° C. For each reaction, the nitrogen flow rate is increased to 10 ml/min when the reaction time reached 405 min. The acid number (AN) and viscosity (I.C.I. cone and plate at 150° C.) of the resin is measured at 405 min and 465 min total reaction time. The results are given in the following Table III.

TABLE III

| Catalyst | AN at 405 min | Viscosity at 405 min | AN at 465 min | Viscosity at 465 min |
|---|---|---|---|---|
| 25* Dibutyltin oxide | 62 | 56 | 48 | 108 |
| 26* Dioctyltin dilaurate | 59 | 62 | 45 | 128 |
| 27 Dibutyltin oxide/dioctyltin dilaurate | 51 | 72 | 39 | 144 |

*Not an example of the present invention.

What is claimed is:

1. In a process for the preparation of hydroxyl or acid terminated polyesters by reacting a dihydroxyl-containing compound with a dicarboxyl-containing compound or anhydride or lower alkyl ester thereof and optionally a tri- or poly-functional hydroxyl or carboxyl containing compound or anhydride or lower alkyl ester thereof in the presence of a tin catalyst; the improvement comprises conducting the reaction in the presence of a synergistic combination of catalysts consisting of (1) at least one organotin salt of a carboxylic acid, and (2) either (a) at least one organotin oxide, or (b) at least one organostannoic acid, or (c) a combination of (a) and (b).

2. The process of claim 1 wherein
   (a) the reaction temperature is from about 150° C. to about 270° C.;
   (b) the dihydroxy-containing compound is an aliphatic, cycloaliphatic or aromatic hydroxyl-containing compound; and
   (c) the dicarboxylic acid is an aliphatic, cycloaliphatic or aromatic carboxyl-containing compound or an anhydride or lower alkyl ester thereof.

3. The process of claim 1 wherein
   (a) the reaction temperature is from about 180° C. to about 250° C.;
   (b) the dihydroxyl-containing compound is neopentyl glycol, ethylene glycol, cyclohexanedimethanol or any combination thereof; and
   (c) the dicarboxylic acid is terephthalic acid, isophthalic acid, adipic acid or any combination thereof.

* * * * *

UNITED STATES PATENT AND TRADEMARK OFFICE
CERTIFICATE OF CORRECTION

PATENT NO. : 5,166,310
DATED : November 24, 1992
INVENTOR(S) : Peter C. Rooney

It is certified that error appears in the above-identified patent and that said Letters Patent is hereby corrected as shown below:

Column 10, line 1-2, "comprises" should be --consisting of--.

Signed and Sealed this

Thirtieth Day of November, 1993

Attest:

BRUCE LEHMAN

Attesting Officer

Commissioner of Patents and Trademarks